(12) United States Patent
Hirvonen

(10) Patent No.: US 7,984,878 B2
(45) Date of Patent: Jul. 26, 2011

(54) APPARATUS AND METHOD FOR BACKUP CONTROL IN A DISTRIBUTED FLIGHT CONTROL SYSTEM

(75) Inventor: Jukka Matti Hirvonen, Pooler, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 543 days.

(21) Appl. No.: 11/654,890

(22) Filed: Jan. 17, 2007

(65) Prior Publication Data

US 2007/0164166 A1 Jul. 19, 2007

Related U.S. Application Data

(60) Provisional application No. 60/759,028, filed on Jan. 17, 2006.

(51) Int. Cl.
*G05D 1/00* (2006.01)
(52) U.S. Cl. ............... 244/194; 244/195; 244/196
(58) Field of Classification Search .......... 244/194, 244/195, 196
See application file for complete search history.

(56) References Cited

U.S. PATENT DOCUMENTS

| | | | | |
|---|---|---|---|---|
| 4,032,757 A | * | 6/1977 | Eccles | 700/81 |
| 4,130,241 A | * | 12/1978 | Meredith et al. | 714/10 |
| 4,198,017 A | | 4/1980 | Murray | |
| 4,236,685 A | | 12/1980 | Kissel | |
| 4,363,098 A | * | 12/1982 | Buus et al. | 701/4 |
| 4,504,233 A | | 3/1985 | Galus et al. | |
| 4,517,639 A | * | 5/1985 | Ferrell et al. | 700/81 |
| 4,533,097 A | | 8/1985 | Aldrich | |
| 4,542,679 A | * | 9/1985 | Murphy et al. | 91/363 A |
| 4,644,538 A | * | 2/1987 | Cooper et al. | 714/10 |
| 4,652,417 A | * | 3/1987 | Sutherland et al. | 376/215 |
| 4,672,529 A | * | 6/1987 | Kupersmit | 700/1 |
| 4,807,516 A | * | 2/1989 | Takats | 91/363 A |
| 4,887,214 A | * | 12/1989 | Takats et al. | 701/3 |
| 5,012,423 A | | 4/1991 | Osder | |
| 5,062,594 A | | 11/1991 | Repperger | |
| 5,076,517 A | | 12/1991 | Ferranti et al. | |
| 5,091,847 A | * | 2/1992 | Herbermann | 714/3 |

(Continued)

FOREIGN PATENT DOCUMENTS

JP 10059293 3/1998

*Primary Examiner* — Tien Dinh
*Assistant Examiner* — Justin Benedik
(74) *Attorney, Agent, or Firm* — King & Spalding

(57) ABSTRACT

Embodiments of the invention relate to a flight control system for controlling an aircraft during flight. The flight control system may include a primary controller configured to receive an input from a pilot and to output a primary control signal and a primary transmission path connected to the primary controller and configured to relay the primary control signal. The flight control system may also include a backup controller configured to receive the input from the pilot and to output a backup control signal and a backup transmission path connected to the backup controller and configured to relay the backup control signal. Additionally, the flight control system may include an actuator having a remote electronics unit configured to receive the primary control signal and the backup control signal and to determine if the primary control signal is available and valid. The remote electronics unit may be configured to output an actuator command based on the primary control signal if the primary control signal is available and valid and to output the actuator command based on the backup control signal if the primary control signal is unavailable or invalid.

24 Claims, 4 Drawing Sheets

U.S. PATENT DOCUMENTS

| | | | |
|---|---|---|---|
| 5,264,768 A | | 11/1993 | Gregory et al. |
| 5,274,554 A | * | 12/1993 | Takats et al. .................... 701/33 |
| 5,347,204 A | | 9/1994 | Gregory et al. |
| 5,374,014 A | * | 12/1994 | Traverse et al. ............... 244/227 |
| 5,383,133 A | * | 1/1995 | Staple .......................... 700/280 |
| 5,412,299 A | | 5/1995 | Gregory et al. |
| 5,473,235 A | | 12/1995 | Lance et al. |
| 5,493,497 A | | 2/1996 | Buus |
| 5,515,282 A | * | 5/1996 | Jackson ........................... 701/4 |
| 5,527,002 A | | 6/1996 | Bilange et al. |
| 5,559,415 A | | 9/1996 | Gregory et al. |
| 5,634,794 A | | 6/1997 | Hildreth et al. |
| 5,670,856 A | * | 9/1997 | Le et al. ........................ 318/564 |
| 5,694,014 A | | 12/1997 | Hegg et al. |
| 5,735,490 A | | 4/1998 | Berthet et al. |
| 5,743,490 A | | 4/1998 | Gillingham et al. |
| 5,806,805 A | * | 9/1998 | Elbert et al. ................. 244/195 |
| 5,875,998 A | | 3/1999 | Gleine et al. |
| 5,881,971 A | * | 3/1999 | Hickman ..................... 244/1 R |
| 5,911,390 A | | 6/1999 | Pohling |
| 6,000,662 A | | 12/1999 | Todeschi et al. |
| 6,064,923 A | | 5/2000 | Bilange et al. |
| 6,082,672 A | | 7/2000 | Audren |
| 6,128,554 A | | 10/2000 | Damotte |
| 6,189,836 B1 | | 2/2001 | Gold et al. |
| 6,443,399 B1 | | 9/2002 | Yount et al. |
| 6,459,228 B1 | | 10/2002 | Szulyk et al. |
| 6,561,463 B1 | | 5/2003 | Yount et al. |
| 6,573,672 B2 | | 6/2003 | O'Rourke et al. |
| 6,622,972 B2 | * | 9/2003 | Urnes et al. .................... 244/194 |
| 6,648,599 B2 | | 11/2003 | Preissler |
| 6,650,973 B2 | | 11/2003 | Yamamoto |
| 6,735,500 B2 | | 5/2004 | Nicholas et al. |
| 6,796,526 B2 | | 9/2004 | Boehringer |
| 6,799,739 B1 | | 10/2004 | Jones |
| 6,860,452 B2 | | 3/2005 | Bacon et al. |
| 2002/0065582 A1 | | 5/2002 | Morrison et al. |
| 2003/0127569 A1 | | 7/2003 | Bacon et al. |
| 2004/0078120 A1 | | 4/2004 | Melkers et al. |
| 2004/0078121 A1 | | 4/2004 | Cartmell et al. |
| 2004/0098140 A1 | | 5/2004 | Hess |
| 2004/0195460 A1 | * | 10/2004 | Sailer ........................... 244/194 |
| 2004/0238688 A1 | | 12/2004 | Audren |

* cited by examiner

APPARATUS AND METHOD FOR BACKUP CONTROL IN A DISTRIBUTED FLIGHT CONTROL SYSTEM

This application claims priority to U.S. Provisional Patent Application 60/759,028, filed Jan. 17, 2006, and entitled "Advanced Flight Control System Architecture," which is assigned to the assignee of the present invention and is hereby incorporated by reference in its entirety. This application is related to U.S. Patent Application filed on Jan. 17, 2007, entitled "System and Method for an Integrated Backup Control System," which is assigned to the assignee of the present invention and is hereby incorporated by reference in its entirety.

FIELD OF THE INVENTION

Embodiments of the invention relate generally to aircraft flight control systems and, more specifically, to the implementation of a redundant, backup control system for a distributed fly-by-wire (FBW) flight control system.

BACKGROUND OF THE INVENTION

With the rapid developments in aircraft technology, ever-increasing flight envelopes, and overall performance, the flight control systems implemented in modern aircraft have become extremely complex. Advanced flight control systems have therefore been developed to address various aircraft characteristics such as flight performance, fuel efficiency, safety, etc. A primary flight control system on a modern aircraft typically includes a complex set of components including pilot controls, aircraft sensors, electronic processor, electronic wiring or data buses, actuators, and control surfaces. Unfortunately, as the primary flight control system increases in complexity, the aircraft may be increasingly vulnerable to a system fault or processor failure.

In accordance with flight regulations and in the interest of developing robust aircraft, modern aircraft include secondary or redundant elements or systems for use in the event that the primary control system fails or experiences system faults. Despite a low probability of failure of processor based control systems, flight control systems often fail to address the problem of a generic fault in the transmission media or in the command processing of the primary flight control system. Although redundant elements of the primary control system may be included as a safety measure, a generic fault occurring in the primary processing or transmission media could disable not only the primary control system but also any redundant elements and, in some cases propagate to separate backup system. Control systems, such as the flight control system disclosed in U.S. Pat. No. 6,860,452, have employed centralized primary and fully redundant backup systems that include dissimilarity between groups of primary and redundant channels in an attempt to address this concern. However, such an approach requires extremely careful analysis and design efforts to insure that the dissimilarity truly applies throughout the entire complex electronics device path needed for the primary flight control.

While a primary flight control system may be typically capable of verifying the integrity of the system through, for example, redundant sensors and two-way digital data buses, a backup flight control system may lack sufficient means to monitor itself or assure proper functioning when unused. For example, during normal flight operation at a steady altitude, attitude, heading, and airspeed, the control signals from a primary and backup system may remain constant over long periods of time. Although the signals from the primary and backup systems may properly correspond under these conditions, it is possible that the backup system may have experienced a fault or be frozen, outputting a temporary correct signal. Consequently, the backup system may be unavailable or disabled despite appearing to function properly, providing pilots and operators a false sense of security.

In a distributed control system, the actuator control loop closure of a control surface actuator is executed at or near the actuator itself and the aircraft level control laws are executed on computing platforms commonly known as the flight control computers ("FCC"), generally located at or near the aircraft cockpit. The introduction of smart actuators, which may include some processing capability, has added the ability to perform certain processor functions at the actuator. A smart actuator, as defined herein, may include a mechanical actuation device, such as hydraulic cylinder and its associated control valves or an electromechanical actuation device, and a remote electronics unit ("REU"). The remote electronics unit may be an integral part of the actuator, a line-replaceable unit ("LRU") mounted on the actuator, or a unit mounted near the actuator. A remote electronics unit, associated with one of the control surfaces on an aircraft, may operate by receiving a control surface position command from a flight control computer (FCC) and then generating a specific signal to the actuator. If the actuator includes a feedback sensor and feedback signal, the remote electronics unit may perform feedback control of the control surface position without relying on the FCC. The FCC may be located, for example, in the avionics bays, typically near the cockpit. By using a REU, a flight control system may reduce the amount of processing needed in the flight control computers.

Distributed control system may also permit the use of different types of data transmission media. Data buses may be used with the smart actuators to monitor the control system, allowing the remote electronics unit of the smart actuator to insure the integrity of the control signal (end-to-end) and monitor a data bus for actuator specific commands. Further, the smart actuators may enable the use of data bus transmission media (such as ARINC429 or CAN bus or their derivatives), significantly reducing the number and weight of the transmission wiring over traditional flight control systems. In some smart actuator control systems, a single two wire bus may be used to connect all of the smart actuators to the processors or control computers. In other, more conservative, smart actuation control systems, multiple dedicated point-to-point data buses may be used to connect the centralized flight control computer or equivalent to each individual smart actuator. There may also be more than one primary point-to-point data bus between the flight control computers and a given smart actuator according to varying levels of redundancy.

SUMMARY OF THE INVENTION

Despite the advancements of smart actuator control systems, the smart actuator flight control systems often fail to address the problem of a generic fault in the transmission media or the command processing of the primary flight control system. In accordance with embodiments of the invention, a simplified backup control system may be used to protect the aircraft in the event of a generic fault in a complex primary control system. Often, pilots refer to a simplified backup control system as the "fly home mode". A simplified backup control system may be configured to only apply to the aircraft control surfaces and, more specifically, to actuators that will provide so-called Minimum Acceptable Control ("MAC") of the aircraft. For example, on some aircraft MAC may be achieved by providing control of actuators moving at least one or two ailerons and one or two elevators and a rudder. In other cases, the rudder may be omitted or a pair of spoilers may be needed for roll control in order to achieve MAC. As understood by those of skill in the art, MAC may be highly dependant on the airframe configuration and its aerodynamic characteristics (i.e. control surface induced aerodynamic moments around the center of gravity of the aircraft at various airspeeds).

Embodiments of the invention may be configured to include two distributed flight control systems, a primary flight control system and a simple backup flight control system that are both independent and dissimilar. The primary control system may also be configured to monitor and insure the integrity of both systems during flight without compromising the simplicity and reliability in the backup flight control system. For example, a backup control system in accordance with embodiments of the invention may be very simple, without any direct monitoring functions, and the more complex primary flight control system may monitor the backup control system during normal operation to insure its availability. Embodiments of the invention may be used to eliminate the need for significant analysis and design efforts to verify dissimilarity between the primary control system and the backup control system. The backup control system may be implemented as an analog or programmable logic based control system or a software based control system.

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Embodiments of the invention are directed to a distributed flight control system configured to employ independent and dissimilar primary and backup flight control systems. The backup control system may be configured as a simplified or Minimum Acceptable Control ("MAC") system, for example. Additionally, the primary flight control system may be configured to verify the integrity of the primary and backup flight control systems and transmission paths during use without endangering the independent and dissimilar characteristics of the backup control system.

Figure 1A:
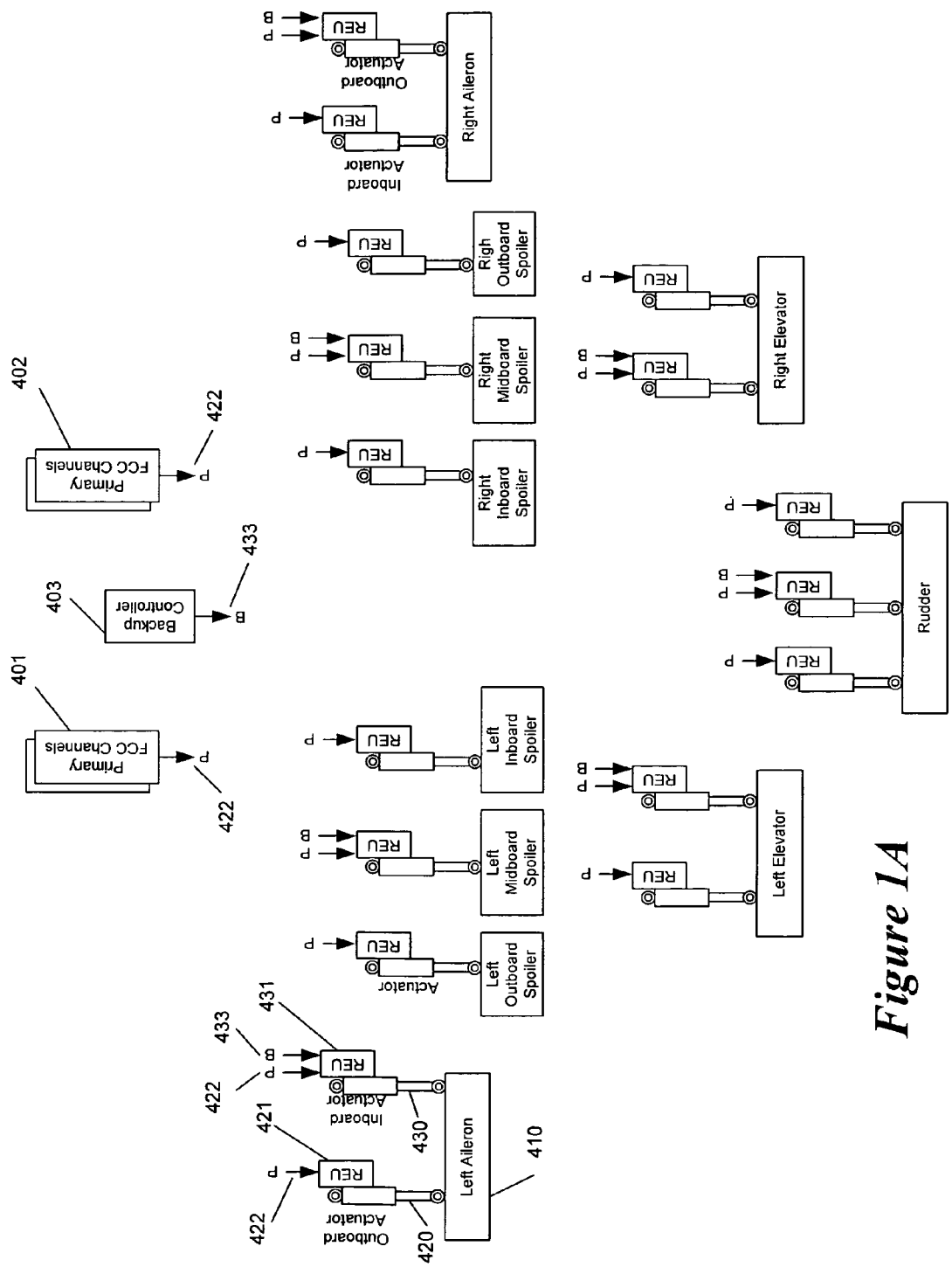
FIG. 1A schematically shows an aircraft level distributed flight control system in accordance with an embodiment of the invention.

FIG. 1A schematically illustrates a sample distributed Fly-By-Wire control system having a primary and backup control arranged in accordance with an embodiment of the invention. As understood by those of skill in the art, the primary and backup control systems shown in FIG. 1A may be modified for other alternative configurations and aircraft by scaling the number of surfaces either up or down depending on the aircraft configuration and size. As shown, the primary command paths are all labels with a "P" and the backup command paths are all labeled with a "B".

The overall distributed flight control system of FIG. 1A includes a primary flight control computer ("FCC") channels 401 and 402, a backup controller 403, and actuators. For simplicity, only actuators 420 and 430 controlling the left aileron 410 have been labeled in FIG. 1A. However, the discussions herein regarding the actuators should be considered to apply to all actuator shown in FIG. 1A. Each of the actuators 420 and 430 represents smart actuators and includes a remote electronics unit ("REU") mounted on or in close proximity to the actuator. The primary FCC channels 401 and 402 may be typically split into two or more groups as shown in FIG. 1A as left and right channels in order to mitigate an local destruction events by physically separating the channels. For example, channels 401 and 402 may be separated to mitigate and damage caused by a fire or bird strike. Additionally, it is often useful to install the backup controller 403 in yet another location on the aircraft to further mitigate local destructive events.

In FIG. 1A, the actuators 420 and 430 are attached to the aileron surface 410. These actuator may be configured such that both actuators 420 and 430 control the position of the aileron 410. The actuators may also be configures such that one actuator is actively controlling the aileron 410 while the other actuator remains on standby and only become active if the active actuator experiences a failure. For example, the actuator 420 could be an active actuator controlling the aileron 410 and the standby actuator 430 only become active if the actuator 420 fails.

In accordance with embodiments of the invention, actuators 420 and 430 are considered smart actuators and are controlled by their own REU. Actuator 420 is coupled to REU 421 and actuator 430 is coupled to REU 431. During normal operation, the REUs 421 and 431 receive primary surface position commands from the primary control channels 401 and 402 via the primary command paths 422. As shown in FIG. 1A, each REU is coupled to the primary channels 401 and 402 via the primary command paths or data buses labeled with a P.

As shown in FIG. 1A, the backup controller 403 is coupled to actuator 430 via the backup command path 433 but is not coupled to the actuator 420. Likewise, the backup controller 403 is connect to some of the REU and actuators but not all. Although the backup controller could be coupled to all of the actuators in a more fully redundant control system, FIG. 1A illustrates one embodiment of the invention where the backup control system connects to only a select number and placement of actuators and control surfaces. For example, as shown in FIG. 1A, the left inboard spoiler is not connected to the backup controller 403. In one embodiment of the invention, the number of actuators connected to the backup controller 403 may be reduced, connecting only to actuators that provide the Minimum Acceptable Control ("MAC") for a given aircraft. The location and number of actuator required to provide MAC will vary greatly depending on the type and size of an aircraft.

As discussed in greater detail below, the REU coupled to each actuator may be configured to determine the validity of the primary control signals on the primary paths 422 and pass the primary control commands to the actuators. For example, the REUs 421 and 431 may determine that the primary command signals on the primary paths 422 are valid and pass the primary command signals to the actuators 420 and 430. However, in the event that the primary channels 401 and 402 experience a general fault or the REUs determine that the primary command signals are invalid or absent, the REUs may revert to the backup control signal and use the backup control signal for the actuators. For example, the REU 431 may determine that the primary command signals on the primary paths 422 are invalid and revert to the backup command signal on the path 433 for controlling the position of the aileron 410. The REU 421 may determine that the primary command signal is invalid and place the actuator 420 in a standby mode, allowing the actuator 430 to completely control the aileron 410.

Figure 1B:
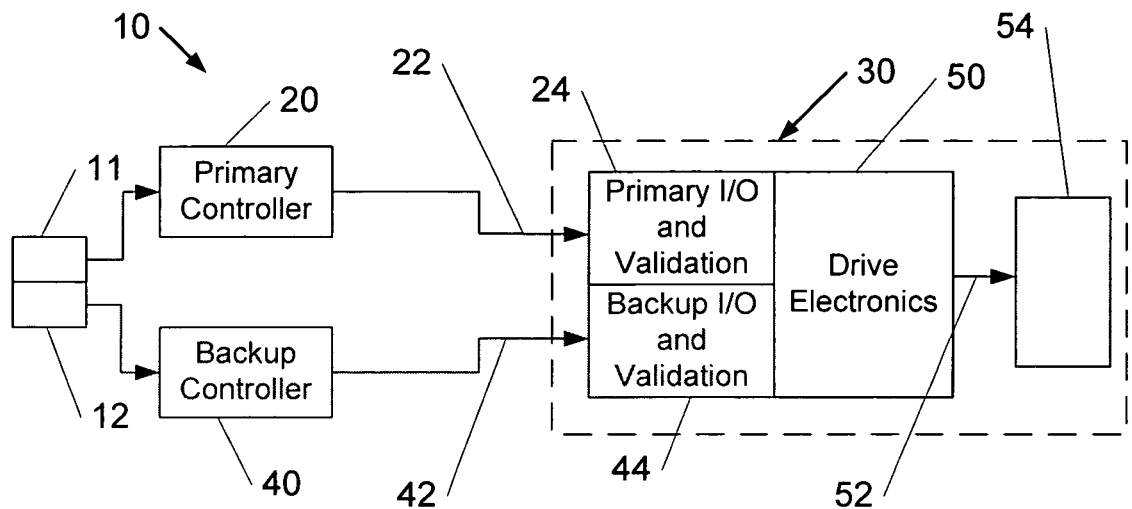
FIG. 1B schematically shows a distributed flight control system in accordance with an embodiment of the invention.

FIG. 1B schematically illustrates a portion of the distributed flight control system shown in FIG. 1A. FIG. 1B illustrate a distributed flight control system 10 having sensors 11 and 12 and a smart actuator 30. The control system 10 includes two independent and dissimilar control systems: a primary flight control system and a backup flight control system. The primary control system, shown in FIG. 1B, may include the sensors 11, the primary controller or processor 20, the control transmission media 22, and the primary I/O and validation 24 associated with the smart actuator 30. It should be understood that the primary controller 20 in FIG. 1B may represent both primary channels 401 and 401 shown in FIG. 1A. Likewise, the transmission media 22 of FIG. 1B may represent the command paths 422 of FIG. 1A. The smart actuator 30 (shown with a dashed box) in FIG. 1B may be considered to represent any REU and actuator in FIG. 1A that is connected to both primary channels 401 and 402 and the backup controller 403. For example, smart actuator 30 may represent actuator 430 and REU 431.

It should be understood that sensors 11 and 12, as simplistically illustrated in FIG. 1B, represent the sensors and associated connections to the control system 10. Likewise, although only one smart actuator 30 is shown in FIG. 1B for simplicity, the control system 10 includes many control system actuators and the smart actuator 30 represents the aircraft control actuators controlling control surfaces such as ailerons, elevators, rudders, etc., for example. As used herein, a distributed system describes a flight control system where the actuator level control loop closure occurs at or near the actuators in REUs (i.e. this function is distributed around the aircraft) while the high, aircraft level control laws are computed in FCCs. The FCCs may also include aircraft level feedback control loops as understood by those of skill in the art. Although the primary processor 20 is represented as a single element, it should be understood that the primary processor may include more than one processor, flight computer or avionics suite, for example. Furthermore, the smart actuator 30 may include more that one smart actuator or collection of actuators, all connected to the primary processor 20.

As shown in FIG. 1B, the primary controller 20 may receive input from the sensor 11, which may represent the various sensors/inputs and/or the system of sensors and inputs connected to the primary controller 20. For example, the sensor 11 may also represent certain aircraft sensors such as the pilot control stick or system sensors such as altitude, attitude, airspeed, etc. A typical control stick may include 3 primary position sensors for each axis (total of 6 for two axis) for the primary control system and only a single backup position sensor per axis for the backup control system. Additionally, the sensor 11 may include a pair of sensors, which when in agreement, return a valid signal to the primary controller 20. The sensor 11 may also represent a plurality of other types of sensors such as airframe body rate sensors and other such sensors that may be used by the primary control system to meet the required monitoring and integrity requirements.

During operation, the primary controller 20 may be configured to receive input signals from the sensor 11 and generate command signals or control signals for the various control surfaces on the aircraft. The primary controller 20 may then transmit the control signals the smart actuators on the aircraft in order to adjust or maintain the control surfaces during flight. For example, the primary controller 20 may transmit a command signal to the smart actuator 30, which may be assigned to control any number of aircraft control surfaces, using the primary transmission path or media 22. A primary I/O and validation module 24 on the smart actuator 30 may receive the control signal from the primary controller 20 through the transmission path 22 and pass the control signal to a programmable device or actuator drive electronics 50 of the smart actuator 30. After processing by the actuator drive electronics 50, an analog control signal 52 may be supplied directly to the actuator 54 to adjust the position of a control surface, such as an aileron, elevator, or other aircraft control surface.

As shown in FIG. 1B, the flight control system 10 may also include a backup control system having a sensor 12, a backup controller or processor 40, a backup control transmission media 42, and a backup I/O and validation 44 on the smart actuator 30. The backup controller 40 and the transmission media 42 shown in FIG. 1B may represent the backup contoller 403 and the backup command path 433 shown in FIG. 1A.

During operation, the backup controller 40 may receive input from the sensor 12. As with the sensor 11, it should be understood that the sensor 12 may represent various sensors/inputs or even the system of sensors and inputs into the backup controller 40. If aircraft level stability is required for the backup control system, such as yaw damping, the sensor 12 may also represent a rate gyro sensor or an accelerometer. Additionally, the sensor 12 may represent a redundant sensor system, where some sensors and controls are shared by both the primary and backup control systems and some sensors and controls are fully redundant.

In accordance with an embodiment of the invention, a backup control system may be configured to only apply to certain aircraft control surfaces and, more specifically, to actuators that will provide MAC of the aircraft. As such, while the primary controller 20 and the primary control system would be connected to and control each smart actuator 30 on an aircraft, the backup controller 44 and the backup control system may be configured to connect to a subset of the smart actuators 30, such as only those required for MAC. To accomplish this, the backup control system may be connected to a single sensor per pilot controller axis, such as the wheel, the column and the rudder pedals (if yaw control is needed).

Because the backup control system is not in active control of the aircraft during normal operation, failures in the backup control system sensors and associated failure transients may not be a significant safety concern for normal flight. However, when the backup control system is needed (i.e. when all the primary controllers have failed), a backup control system that does not include self-monitoring function may provide a robust and simple control system for emergency circumstances.

In order to maintain the back up control system as independent and dissimilar, the backup control system may be configured to provide data to other aircraft systems, such as the primary flight control system, the Crew Alerting System or another monitoring functions in the aircraft. However, in accordance with some embodiments of the invention, the backup control system may be configured such that other systems (not including systems like the aircraft electrical power system) do not provide data to the backup control system and are not needed for its operation. Consequently, the backup control system may be configured as a totally independent backup control system, isolated from other systems in the aircraft. In this manner, the backup control system may be shielded from generic faults or failures in other aircraft system propagating to the backup control system, maximizing the availability of the backup control system when needed.

Again, although FIG. 1B shows only one smart actuator 30, the backup control system may connect to all the smart actuators on the aircraft or some lesser set thereof. As mentioned above, the backup control system may be configured to control only a limited number of aircraft control surfaces with backup or selected actuators, sufficient to meet MAC requirements. For a given control surface, such as an aileron, it is contemplated that backup actuators (not shown) may be included in addition to the actuator 54 shown in the smart actuator 30. The backup actuators may be independent and dissimilar from the primary actuators controlled by the primary control system, requiring that the primary actuators, attached to the same aircraft control surfaces, be placed in a standby or by-pass mode once they have lost their (primary) control signals. This may ensure that the backup actuators, when active and controlled by the backup controller, may actuate the control surfaces according to the backup control signals without fighting other actuators.

The backup controller 40 may be configured to receive input signals from the sensor 12 and generate a command signal or control signal for controlling the various control surfaces on the aircraft. The backup controller 40 may be connected to a smart actuator 30 of the aircraft using the backup transmission path or media 42. The backup I/O and validation module 44 on the smart actuator 30 may receive the control signal from the backup controller 20 through the transmission path 42 and pass the control signal to the actuator drive electronics 50 of the smart actuator 30. After processing by the actuator drive electronics 50, a control signal 52 may be supplied directly to the actuator 54 to adjust the position of a control surface. In the event that a separate backup actuator is used, the actuator drive electronics 50 may provide the control signal 52 to the backup actuator when the actuator 54 is in a by-pass mode.

In accordance with one embodiment of the invention, the transmission media 22 and 42 may be of different types. In one embodiment of the invention, these media types may include completely dissimilar media, such as employing a digital data bus (for example, using wires or fiber optics) as the primary transmission media 22 and an analog data bus as the backup transmission media 42. Additionally, one media may be based on a traditional wired system and the other media may be based on a wireless transmission system, assuring completely dissimilar transmission systems. In another embodiment of the invention, the two transmission medias 22 and 42 may employ the same protocol, but use completely redundant components. For example, the transmission medias 22 and 42 may both employ ARINC 429 with separate and dissimilar hardware for each of path. However, if the same transmission media is used, the backup control system and the primary control system may still maintain dissimilarity by implementing different hardware and software in the other elements of the backup control system.

Although reducing the number of control channels and complexity of a primary control system may be difficult due to the ever increasing demands on flight envelops and performance, reductions in the complexity of the backup flight control system may complement the design of a robust and simple backup control system in the case of emergencies and/or loss of the primary control system.

The actuator drive electronics 50 may be configured to default to the primary control system but revert to the backup control system in the event the primary control signal is invalid or absent. To accomplish this, the smart actuators 30 may include processing hardware and software capable of evaluating viability of the control signals on the primary transmission media 22, which is discussed below. If the primary control system is determined by the primary I/O and validation device 24 of the smart actuator 30 to be valid, then the control signal from the primary control system may be passed along as control signal 52 to the actuator 54. However, if the control signal is missing or determined by the primary I/O and validation device 24 to be invalid, the actuator drive electronics 50 may revert to the backup control system and the backup control signal, received from the backup transmission media 42, may be processed and passed on to the actuator 54 as control signal 52. In the event that neither the primary or the backup control signals are invalid or missing, the actuator may be placed in a safe mode.

The validation of the primary control signal transmitted on the transmission media 22 to the smart actuator 30 may be accomplished by several means known to those of skill in the art. One approach may be for the primary I/O and validation device 24 to echo the primary controller 20 command signal as received by the smart actuator 30 back to the primary controller 20. If the primary controller 20 determines that the received echo matches the primary control command, the signal may be declared valid and an instruction may be sent to the smart actuator 30 to use the primary control signal. If the echo does not match within a certain persistency period, then the signal may be declared invalid. Another approach for the validity verification may include using an error detection coding, such as cyclic redundancy check ("CRC"), where the primary controller 20 may calculate a CRC value based on a predetermined CRC polynomial and transmit the CRC to the smart actuator 30. The smart actuator 30 may then divide the received CRC by the same polynomial that was used to generate the CRC and if the remainder of this division is zero, the data transmission may be considered valid. If the remainder is nonzero, then, the data transmission may be considered invalid. Other types of validation known in the art may be used. The decision to revert to a backup control signal may be controlled by the pilots or based on the fact if the primary control signal is determined invalid within an appropriate persistency period.

In order to create more dissimilarity between the primary and backup control systems, the backup control system may use a simple and discrete HI/LO gain schedule as opposed to the more advanced gain schedules used on a typical primary control system. For example, as understood by those of skill in the art, a primary flight control system may include a smooth airspeed, impact pressure or equivalent based gain scheduling as part of its primary control processing. However, for a simplified backup control system, this type of gain schedule may not be necessary because the backup control system may not need to meet all the handling quality requirements. Instead, the backup control system and the backup controller 40, depending on the aircraft requirements, may employ other simplified discrete gain schedules, such as, for example, a high speed gain and low speed gain. In order for the primary control system to effectively monitor the backup control system, the primary control system may be configured to verify that the backup control signals is in accordance with a model of these backup control laws. The model of the backup control laws may be easily implemented in the software of the primary controllers as understood by those of skill in the art.

Figure 2:
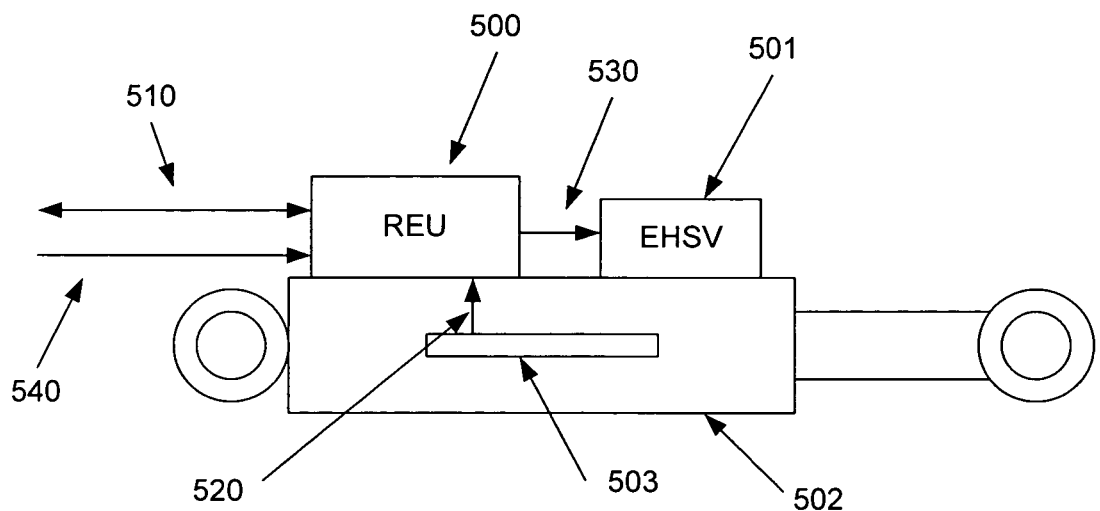
FIG. 2 schematically shows an example of a smart actuator using a remote electronics unit in accordance with an embodiment of the invention.

An example of the smart actuator 30, shown in FIG. 1B, is schematically illustrated in FIG. 2. An REU 500 may receive a primary flight control command via data link 510. In the case of a hydraulic actuator, as shown in FIG. 2, the REU 500 may be configured to generate a command signal 530 to the electro-hydraulic servo-valve ("EHSV") 501 based on the flight control command via the data link 510. A position feedback sensor 502 may be return an actuator position feedback signal 520 to the REU 500. As such, feedback control of the smart actuator may be accomplished based on the command signal 530 and the actuator position feedback sensor signal 520. As understood by those of skill in the art, the servo loop closure shown in FIG. 2 may be implemented with either analog or digital electronics depending on the optimum solution for the given application or software.

In the event the backup control system is initiated by the pilots or used in the absence of a valid primary control system signal, the REU 500 may use a backup control command via the data link 540. The REU 500 may then generate the control signal 530 based on the backup control. The backup control signal via the data link 540 may be implemented as a digital data bus or in an analog format. The REU 500 may then generate a command signal 530 to the actuator 501 based on the backup control command. The feedback sensor signal 520 may also be used as discussed above to generate the command signal 530.

Figure 3:
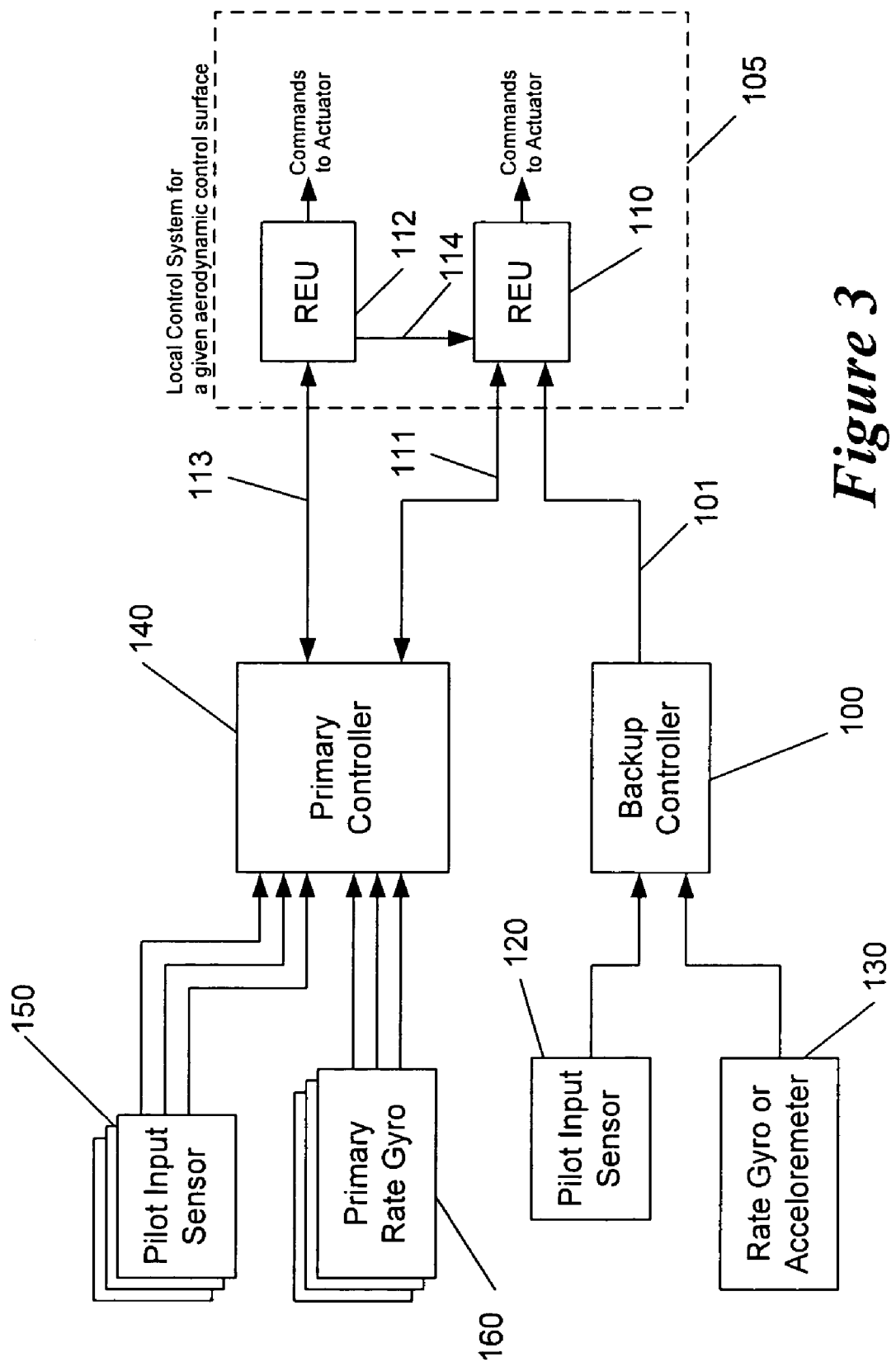
FIG. 3 schematically shows another example of a distributed flight control system in accordance with an embodiment of the invention.

Referring to FIG. 3, another embodiment of the invention includes incorporating locally augmented backup control system architecture. In certain aircraft, most notably aircraft with relaxed static stability or a particular natural motion of the aircraft, it may be necessary to damp certain motions, such as dampening a Dutch-roll motion via a yaw damper, for example. In such cases, it may also be necessary to provide the backup or backup control system with certain augmentation signals such as aircraft angular rates. It should be understood that the augmentation signals may be gathered from various sources, including both primary sensors and/or backup sensors.

In FIG. 3, a primary controller 140 may receive inputs from a pilot input sensor 150, which may represent a control stick or other pilot control, for example. The controller 140 may also receive aircraft sensors 160, such as redundant primary rate gyro sensors, typical of a primary control system. The primary controller 140 may generate a control signal for a aerodynamic control surface 105 and provide the primary command signals to the control surface actuator of the primary command paths 111 and 113, which connect to REU 110 and REU 112 respectively. As an example, control surface 105 and the REUs 110 and 112 may represent the left aileron 410 and the REUs 421 and 421 in FIG. 1A.

The backup controller 100 may be configured to receive an input signal from a pilot input sensor 120 and receive augmentation signals from a rate gyro or accelerometer sensor 130. The backup controller 100 may be configured to damp certain aircraft motions, such as a Dutch roll, using, at least in part, data received from the sensor 130. Upon generating a backup control signal, the backup controller 100 may be configured to transmit the backup control signal to the REU 110 via the backup command path 101. As with other embodiments of the invention, the backup command path 101 may be configured as a unidirectional data bus while the primary command paths 111 and 113 may be configured as bidirectional data buses.

As discussed above, the REUs 110 and 112 may be configured to validate the primary control signal and revert to the backup control signal only if all the primary control signals are invalid. For example, on a two actuator control surface like control surface 105, REU 110 and REU 112 may be configured to use the primary control signals and only have the REU 110 revert the backup control signal in the event that both primary control signals on both primary paths 113 and 111 are determined to be invalid. In order to prevent a premature engagement of the backup controller 100 commands on the REU 110, for example when the primary control signal on path 111 is invalid but the primary control signal on path 113 is still valid, a status signal 114 as shown between REU 112 and REU 110 may be implemented. This signal may be based on very basic command signals (such as the actuator mode select valve control signals) of the actuator control. The signal 11 may use very simple communication elements, such as analog or discrete interfaces, and the signal 114 may be transmitted on redundant connections to further insure that a single connection fault would not result in a premature engagement of the backup control system of control surface 105. So long as the status signal 114 indicates that the REU 112 is receiving a valid primary control system, the REU 110 will not revert to backup control signals from the backup controller 100 even if the primary path 111 is unavailable. In the meantime, the REU 110 may be configured to place its associated actuator (not shown in the figures) in a standby mode, allowing the REU alone to control the control surface 105.

Figure 4:
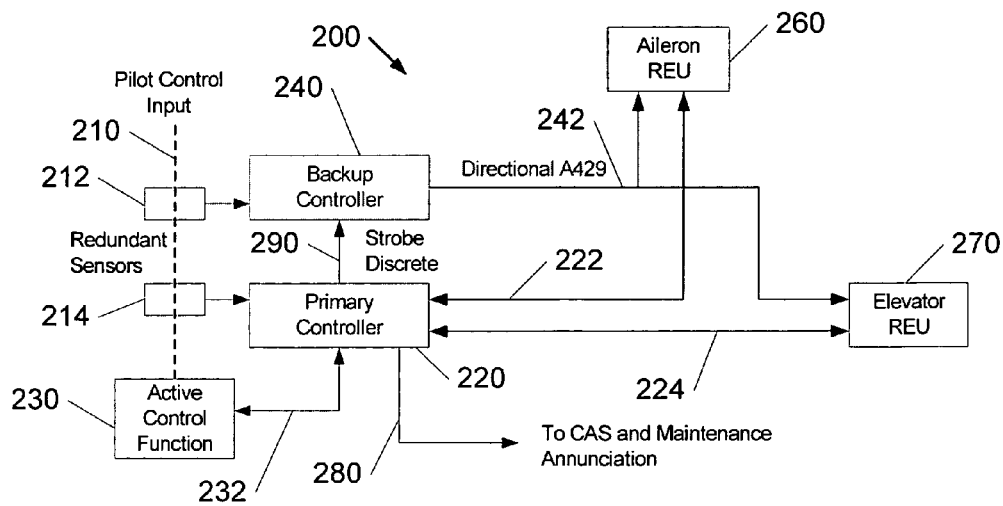
FIG. 4 shows another distributed flight control system in accordance with an embodiment of the invention.

FIG. 4 schematically illustrates a portion of a distributed control system 200 having two dissimilar flight control systems, a primary control system and a backup control system with different transmission medias. Again, it should be understood that elements shown in FIG. 4 may represent elements shown on the aircraft level illustration in FIG. 1A. For example, the primary controller 240, the backup controller 220, the primary transmission media 242, the backup transmission media 222 and 224, the aileron REU 260, and the Elevator REU 270 in FIG. 4 all represent elements in FIG. 1A.

The control system 200 may include additional sensors, controllers, actuators, and other elements beyond what is shown in FIG. 4. During operations, it is contemplated that the smart actuators may be configured to determine whether to use the primary flight control signal or the backup flight control signal for actuation. In the embodiment of the invention shown in FIG. 4, the backup control system may be implemented with easily reconfigurable digital wiring and programmable devices, with inherent signal integrity features that may be built into the digital data buses, as understood by those of skill in the art.

The control system 200 shown in FIG. 4 may be configured to include a pilot input 210, which may include a control stick or other pilot control. The input may be sensed by redundant sensors 212 and 214, with one sensor dedicated to the primary flight control system and the other to the backup flight control system. It should be understood that various levels of redundancy may be implemented at the sensor level, including mechanical redundancy, redundant wiring, or even in some cases complete redundancy as shown in FIG. 4 with sensors 212 and 214.

Referring to the primary flight control system shown in FIG. 4, the input 210, which may include any number of instruments that may be sensed by a sensor 214 and then received by the primary flight controller 220. Upon processing the necessary information and computing the proper controls signals, the primary controller 220 may provide control signals by data buses to the various actuators or control surfaces of the aircraft. For example, as shown in FIG. 4, the primary controller 220 may provide a control signal to the Aileron REU 260 using a data bus 222. Further, the primary controller 220 may provide a control signal to the Elevator REU using a data bus 224. The primary flight controller 220 may also provide data for other functions by other transmission paths such at path 280, which may provide data for a crew alerting system ("CAS") and maintenance announcements, and path 232, which may provide data for an active control function 230 or other feedback devices for the cockpit or pilots.

In accordance with one embodiment of the present invention, a bi-directional data bus, such as a modified ARINC 429 or RS-485 data bus or the like, may be employed as shown in FIG. 4 between the primary controller 220 and the actuators 260 and 270. As understood by those of skill in the art, a simple bi-directional transmission type is well-proven, simple and robust. Furthermore, existing maintenance tools (e.g. data bus readers) may be used to analyze and monitor system operations and integrity.

Although individual data buses, with one data bus dedicated to each actuator, may be configured to connect the primary flight controller 220 to the aircraft actuators, it should be understood that a single data bus may be dedicated for all the actuators. In other words a single data bus may be used to connect the primary controller 220 to all of the actuators on the aircraft with each control signal being separated or labeled as known by those of skill in the art. For example, a ARINC 429 data bus may be used to connect all the actuators to the primary controller with control signals to the various actuators separated by ARINC 429 data labels. Redundancy requirements may dictate that more that one data bus is used because a single wire fault could impact data transmissions to all actuators simultaneously. However, in vehicles, such as a unmanned aerial vehicle, where loss of control is not so critical, a single data bus may be used.

Referring to the backup flight control system, the backup or backup controller 240 may receive input from the redundant sensor 212. Instead of a bi-directional data bus, as used in the primary flight control system, a directional data bus 242 may be used to connect the backup controller 240 to the actuators 260 and 270. As shown in FIG. 4, a single data bus 242 may be used to make the connections for the backup control system. However, individual data buses may be used for each actuator.

The directional data bus 242 of the backup control system may provide simplicity and robustness to the backup system. Further, a simplified backup controller may be configured to provide basic control system functions without the high-end performance driven functions of the primary controller. As such, the backup flight control system as a whole may be less likely to fail during flight despite being less expensive and easier to program and maintain.

As discussed above, the smart actuators may include REU devices that may perform processes and monitor the integrity of the primary control signals. In FIG. 4, the actuators 260 and 270 may be configured as smart actuators and, due to the bidirectional data buses 222 and 224 on the primary control system, the smart actuators 260 and 270 may be configured to monitor and verify the integrity of the primary control system. This may be accomplished by transmitting verification data, or other types of data, back through the bi-directional data buses 222 and 224 to the primary controller 220 in order to monitor the health and validity of the primary control system.

As shown in FIG. 4, the primary controller 220 may be connected to the backup controller 240 using a data bus 290. The primary control system and the backup control system may be completely independent and disconnected other than the data bus 290. Although the data bus 290 may be bi-directional, a unidirectional data bus 290 may be used to introduce greater separation and dissimilarity between the primary and backup control systems as two discrete control systems.

The backup or backup flight control system may be monitored during the normal operation, so that, at the least, its existence may be assured if it is needed. As an example of one embodiment of the present invention, the backup control signal received by the smart actuator 260 from the backup controller 240 and the directional bus 242 may be verified or monitored via the primary control systems. The backup control signal may be processed by, for example, the smart actuator 260 and transmitted on the bi-directional bus 222 to the primary controller 220. The primary control system may then analyze the backup control signal to ensure the integrity of the backup control system. In the event that the backup control signal received by the primary controller 220 is not accurate, the pilots or operators may be alerted.

In another embodiment of the invention, the backup flight control system may be monitored using simple and limited validation data as a means of monitoring the integrity and/or availability of the backup control system without burdening the primary control system transmitting and evaluating the entire backup control signal. This may be significant if traffic on the bi-directional data bus 222 precludes transmitting the entire backup control signal back to the primary controller 220 or if monitoring the backup control signal consumes significant processing capacity in the primary controller. As used herein, validation data may include discrete a simple strobe bit or stimulus bit, which may be a single bit transmitted along with the backup control system communications. It should be understood that the validation data may also include other forms of data that may be larger than a bit, such as a number of word for example.

Figure 5:
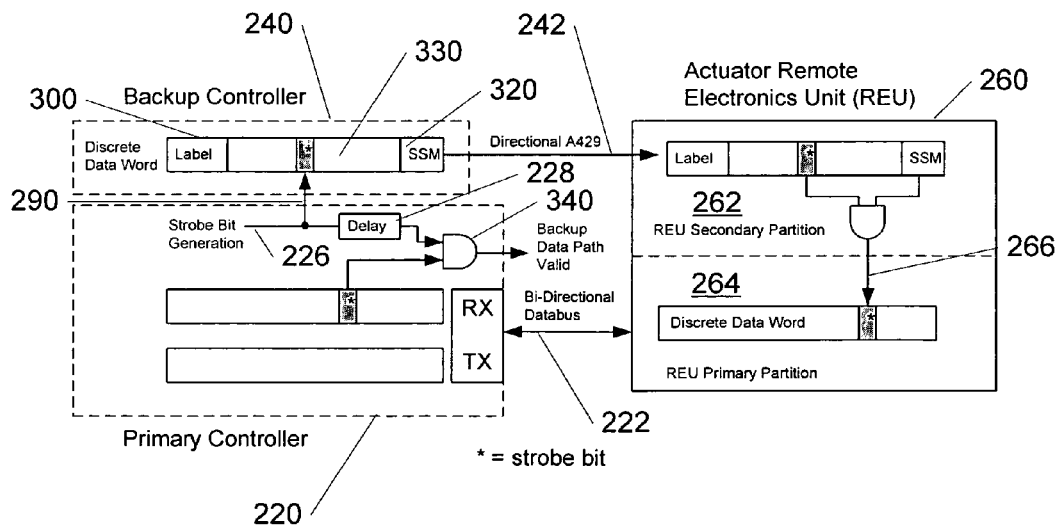
FIG. 5 schematically shows a portion of a distributed flight control system in accordance with an embodiment of the invention.

FIG. 5 schematically illustrates one embodiment of the invention where the availability of the backup control system may be monitored using validation data. As shown in FIG. 5, a primary control system may be configured to use the bidirectional nature of the primary control path 222 to monitor the existence of the backup control system without validating the entire backup control signal. The primary controller 220 may include a strobe bit generator 226, which may provide a strobe bit to the data bus 290. The strobe bit may also be provided to a delay 228 in the primary controller 220 for validating the backup control system as discussed below.

The strobe bit may be received by the backup controller 240 and inserted into a discrete data word. As shown, the discrete data word may begin with a label 300 and end with a SSM 320 as understood by those of skill in the art. Between the label 300 and the SSM 320, the data word 330 may include information and control signals that may be transmitted on the directional data bus 242 to the smart actuators, for example actuator 260.

Upon transmitting the data word from the backup controller 240, the data word may be received by the smart actuator 260. The REU of the actuator 260 may include a REU backup partition 262 and a REU primary partition 264. The REU backup partition 262 may be configured to receive the label 300, the SSM 320 and the data word 330, including the strobe bit. The REU backup partition 262 may also be configured to transmit the strobe bit and the SSM 320 to the REU primary partition 264 using a transmission path 266.

It should be understood that the transmission path 266 and the transmission path 290 may be configured as links using directional data buses, bi-directional data buses, and/or an optical links. These links 266 and 290 may be isolated (e.g. optic-isolation or the like) so that any failure in one control system does not propagate to the other control system via the links. These links may be configured such that they do not impact the control function of either control system and such that the loss of either link 266 and 290 does not impact the operation of either control system. The links 266 and 290 may be configured to function only for monitoring the transmission path integrity, not for any actual control. Further, the strobe bit may be used to verify the existence and operation of the backup transmission path but does not verify the actual integrity or accuracy of the backup control signals.

In practice, the primary controller 220 (with its greater processing capacity) may generate a strobe bit that is sent to the backup controller 240 via the isolated data link 290 described above. This strobe bit may then be included in the discrete status data word transmission from the backup controller 240 to the REU backup partition 262 of the smart actuator 260. If received with a valid SSM 320, the discrete data word may be linked over to the primary path using another isolated cross-path link 266. One of the primary functions of the REU primary partitions 264 may be to wrap the strobe bit into the transmission back to the primary controller 220 via the bi-directional primary path 222.

The primary controller may then be configured to compare the strobe bit transmission received from the REU primary partition 264 with the strobe bit transmission received by the delay 228 from the strobe bit generator 226. With the appropriate delay and persistency to account for any transmission latencies, the strobe bit return from the REU primary partition 264 is compared with the original strobe bit in the comparator 340. A valid status from the comparator 340 may be transmitted to other aircraft systems such as the Crew Alerting and Maintenance Systems. If an invalid status is received from the comparator, the flight crew may be alerted such that the appropriate actions can be taken by the flight or maintenance crew by identifying a fault in the backup control path. Therefore, the integrity of the backup control path may be monitored even it the backup control system is not in use.

As an alternative to the use of a strobe bit as the validation data shown in FIG. 5, other types of data may be used as a stimulus for the backup control system. For example, the strobe bit generator could be replaced with an incremental counter to insert a number into the backup control system data word. The number may increases with each transmission until the incremental counter resets. If the number returned by the REUs matches the transmitted number, then a backup control system may be transmitted to other aircraft systems. It is also contemplated that the validation data may be used as part of a system pre-flight check in lieu of continuous in-flight monitoring.

It should be understood that the embodiments described above may be configured using other transmission technologies such as wireless transmission paths and simple directional RF links. The verification using the strobe bit may also be established and implemented using wireless technology. As such, the integrity of an RF link for a backup control system may be monitored during the normal system operation, even when the backup control path is not in active use.

The foregoing descriptions of specific embodiments of the invention are presented for purposes of illustration and description. They are not intended to be exhaustive or to limit the invention to the precise forms disclosed. One skilled in the art will recognize that other changes may be made to the embodiments described herein without departing from the spirit and scope of the invention, which is defined by the claims, below.

What is claimed is:

1. A flight control system for controlling an aircraft, comprising:
   a plurality of primary controllers each configured to receive a first input and to output a primary control signal;
   a plurality of first transmission paths each coupled to a respective one of the primary controllers and configured to relay the primary control signal;
   an independent and dissimilar controller comprising at least one functional component that is dissimilar from a corresponding functional component of the primary controllers, wherein the differences of the dissimilar functional components of the primary controllers and independent and dissimilar controller comprise at least one of a wireless system versus a wired system, digital data transmission versus analog data transmission, and separate and distinct gain schedules, the independent and dissimilar controller configured to receive a second input and to output a backup control signal;
   a second transmission path coupled to the independent and dissimilar controller and configured to relay the backup control signal;
   an actuator having actuator electronics configured to receive the primary control signal along at least one of the first transmission paths and the backup control signal along the second transmission path, the actuator electronics being configured to determine if the primary control signal is valid, the actuator electronics being located remotely from the primary controllers and adjacent to the actuator, and the actuator electronics being further configured to output an actuator command based, at least in part, on the primary control signal if the primary control signal is valid and to output the actuator command based, at least in part, on the backup control signal if the primary control signal is not valid.

2. The flight control system of claim 1, wherein the primary controllers receive the first input from a primary sensor and the independent and dissimilar controller receives the second input from a redundant sensor.

3. The flight control system of claim 1, wherein the actuator is placed in a predetermined safe mode if neither the primary control signal nor the backup control signal are valid.

4. The flight control system of claim 1, wherein the actuator electronics are further configured to receive an actuator sensor input and to compute the actuator command based, at least in part, on the actuator sensor input and at least one of the primary control signal or the backup control signal.

5. The flight control system of claim 1, wherein at least one of the first transmission paths is bi-directional.

6. The flight control system of claim 5, wherein the second transmission path is unidirectional.

7. The flight control system of claim 6, wherein:
   the actuator electronics are further configured to transmit the backup control signal to at least one of the primary controllers via at least one of the first transmission paths; and
   the at least one of the primary controllers is further configured to monitor the backup control signal and to generate a backup control system status signal.

8. The flight control system of claim 1, wherein the independent and dissimilar controller is separate from the primary controllers.

9. The flight control system of claim 1, wherein the second transmission path is separate and independent from the first transmission paths.

10. The flight control system of claim 1, wherein the plurality of primary controllers comprises hardware and software components that are distinct from corresponding hardware and software components of the independent and dissimilar controller.

11. A backup control signal monitoring system for a flight control system, comprising:
a primary controller configured to receive a first input and to output a primary control signal;
a first transmission path coupled to the primary controller and configured to relay the primary control signal;
an independent and dissimilar controller comprising at least one functional component that is dissimilar from a corresponding functional component of the primary controller, wherein the differences of the dissimilar functional components of the primary controller and independent and dissimilar controller comprise at least one of a wireless system versus a wired system, digital data transmission versus analog data transmission, and separate and distinct gain schedules, the independent and dissimilar controller configured to receive a second input and to output a backup control signal; the independent and dissimilar controller being separate from the first controller;
a second transmission path coupled to the independent and dissimilar controller and configured to relay the backup control signal, the second transmission path being separate and independent from the first transmission path;
an actuator having actuator electronics located remotely from the primary controller and adjacent to the actuator; and
the actuator electronics being configured to receive the primary control signal along the first transmission path and the backup control signal along the second transmission path and configured to transmit backup validation data to the primary controller via the first transmission path and configured to determine if the primary control signal is valid;
wherein the primary controller is further configured to generate a backup control system status signal based, at least in part, on the backup validation data.

12. The monitoring system of claim 11, wherein the second transmission path is unidirectional.

13. The monitoring system of claim 11, wherein the backup validation data includes the backup control signal.

14. A flight control system, comprising:
a plurality of primary processors configured to receive a first input and to output a primary control signal;
a plurality of first paths coupled to a respective one of the primary processors and configured to relay the primary control signal;
an independent and dissimilar processor comprising at least one functional component that is dissimilar from a corresponding functional component of the primary processors, wherein the differences of the dissimilar functional components of the primary processors and independent and dissimilar processor comprise at least one of a wireless system versus a wired system, digital data transmission versus analog data transmission, and separate and distinct gain schedules, the independent and dissimilar processor configured to receive a second input and to output a backup control signal; the second controller being separate and independent from the primary controllers;
a second path coupled to independent and dissimilar processor and configured to relay the backup control signal, the second path being separate and independent from the first path;
a first actuator coupled to an aircraft control surface, the first actuator having a first actuator electronics coupled to at least one of the first paths, the first actuator electronics configured to receive the primary control signal and to determine if the primary control signal is valid; and
a second actuator coupled to the aircraft control surface, the second actuator having a second actuator electronics coupled to the at least one of the first paths and the second path, the second actuator electronics configured to receive the primary control signal and the backup control signal and to determine if the primary control signal is valid;
wherein the second actuator electronics are configured to use the backup control signal to control the aircraft control surface only if the first actuator electronics and the second actuator electronics determine that the primary control signal is not valid.

15. The control system of claim 14, further comprising:
a status link coupled between the first actuator electronics and the second actuator electronics;
wherein the second actuator electronics receives information via the status link indicating whether the first actuator electronics determined that the primary control signal is not valid.

16. The control system of claim 15, wherein the at least one of the first paths comprises:
a first primary path coupled between the primary controllers and the first actuator electronics and configured to relay the primary control signal to the first actuator electronics; and
a second primary path coupled between the primary controllers and the second actuator electronics and configured to relay the primary control signal to the second actuator electronics, the second primary path being separate from the first primary path.

17. A method of controlling an aircraft control surface, comprising:
receiving a primary control signal in an actuator electronics from a plurality of primary processors, the actuator electronics being separate and independent from the primary processors;
receiving a backup control signal in the actuator electronics from an independent and dissimilar processor comprising at least one functional component that is dissimilar from a corresponding functional component of the primary processors, wherein the differences of the dissimilar functional components of the primary processors and independent and dissimilar processor comprise at least one of a wireless system versus a wired system, digital data transmission versus analog data transmission, and separate and distinct gain schedules, the actuator electronics being separate and independent from the independent and dissimilar processor;
determining whether the primary control signal is valid in the actuator electronics;
generating an actuator command signal by the actuator electronics based, at least in part, on the primary control signal if the primary control signal is valid;

generating the actuator command signal by the actuator electronics based, at least in part, on the backup control signal if the primary control signal is not valid;

actuating an actuator based on the actuator command signal to control an aircraft control surface.

18. The method of claim 17, further comprising placing the actuator in a predetermined safe mode if neither the primary control signal nor the backup control signal is valid.

19. The method of claim 17, further comprising:
receiving an actuator position feedback signal in the actuator electronics;
wherein:
generating the actuator command signal is based, at least in part, on the actuator position feedback signal and the primary control signal if the primary control signal is valid; and
generating the actuator command signal is based, at least in part, on the actuator position feedback signal and the backup control signal if the primary control signal is not valid.

20. The method of claim 17, wherein the plurality of primary controllers comprises hardware and software components that are distinct from corresponding hardware and software components of the independent and dissimilar controller.

21. A method of operating a flight control system, comprising:
receiving a primary control signal in an actuator electronics from a plurality of primary processors, the actuator electronics being separate and independent from the primary processors;
receiving a backup control signal in the actuator electronics from an independent and dissimilar processor comprising at least one functional component that is dissimilar from a corresponding functional component of the primary processors, wherein the differences of the dissimilar functional components of the primary processors and independent and dissimilar processor comprise at least one of a wireless system versus a wired system, digital data transmission versus analog data transmission, and separate and distinct gain schedules, the actuator electronics being separate and independent from the independent and dissimilar processor;
transmitting backup validation data from the actuator electronics to the primary processors;
generating a backup control system status signal based, at least in part, on the backup validation data;
generating an actuator command signal by the actuator electronics based, at least in part, on at least one of the primary control signal or the backup control signal; and
actuating an actuator based on the actuator command signal to control an aircraft control surface.

22. The method of claim 21, wherein the backup validation data includes the backup control signal.

23. A method of controlling an aircraft control surface, comprising:
receiving a primary control signal in a first actuator electronics from a primary processor, the actuator electronics being separate and independent from the primary processor;
receiving the primary control signal in a second actuator electronics from the primary processor, the second actuator electronics being separate and independent from the primary processor;
receiving a backup control signal in the second actuator electronics from an independent and dissimilar processor comprising at least one functional component that is dissimilar from a corresponding functional component of the primary processor, wherein the differences of the dissimilar functional components of the primary processor and independent and dissimilar processor comprise at least one of a wireless system versus a wired system, digital data transmission versus analog data transmission, and separate and distinct gain schedules, the second actuator electronics being separate from the independent and dissimilar processor;
determining whether the primary control signal is valid in the first actuator electronics;
determining whether the primary control signal is valid in the second actuator electronics;
generating a first actuator command signal in the first actuator electronics based, at least in part, on the primary control signal if the first actuator electronics determines the primary control signal is valid;
generating a second actuator command signal in the second actuator electronics based, at least in part, on the primary control signal if the second actuator electronics determines the primary control signal is valid;
generating the second actuator command signal in the second actuator electronics based, at least in part, on the backup control signal if the first actuator electronics and the second actuator electronics determine that the primary control signal is not valid;
actuating a first actuator based on the first actuator command signal to control an aircraft control surface; and
actuating a second actuator based on the second actuator command signal to control the aircraft control surface.

24. The method of claim 23, further comprising:
transmitting status information across a status link between the first actuator electronics and the second actuator electronics;
determining in the second actuator electronics whether the first actuator electronics determined that the primary control signal is not valid based, at least in part, on the status information.

* * * * *